Figure 1:
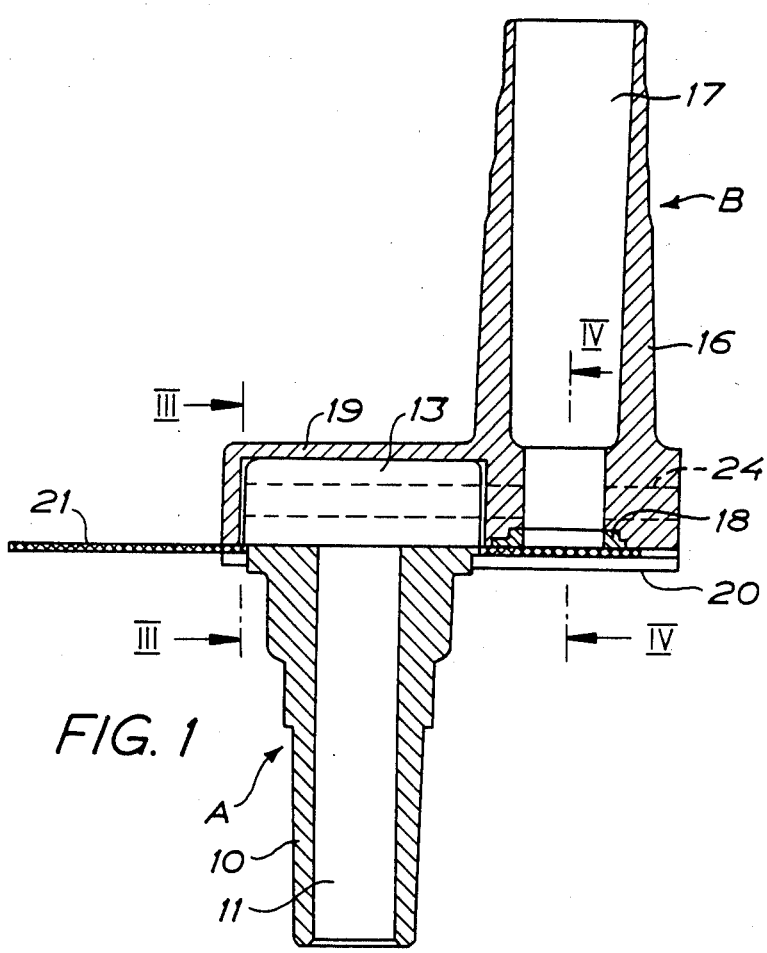

United States Patent [19]

Svensson et al.

[11] Patent Number: 4,576,199
[45] Date of Patent: Mar. 18, 1986

[54] SLIDE VALVE AND COUPLING UNIT

[76] Inventors: Jan A. Svensson, Solhemsgatan 12, Huskvarna, Sweden, S-561 35; Robert Axelsson, P.O. Box 4010, Huskvarna, Sweden, S-561 04

[21] Appl. No.: 588,533

[22] Filed: Mar. 12, 1984

[30] Foreign Application Priority Data

Dec. 19, 1983 [SE] Sweden ................. 8307017

[51] Int. Cl.⁴ ............................................. F16L 37/28
[52] U.S. Cl. .......................... 137/614.04; 137/614.02; 251/149.5; 604/248; 604/905
[58] Field of Search ............... 137/614.02, 614.03, 137/614.04; 251/149.6, 149.5, 149.8; 604/248, 905, 249

[56] References Cited

U.S. PATENT DOCUMENTS

| 202,368 | 4/1878 | Newton | 137/614.04 |
| 610,035 | 8/1898 | Edgington | 137/614.02 |
| 631,688 | 8/1899 | Williams | 137/614.02 |
| 807,499 | 12/1905 | Roulstone | 137/614.02 |
| 2,709,090 | 5/1955 | Zeeb | 137/614.01 |
| 2,757,941 | 8/1956 | Zeeb | 137/614.01 |
| 2,844,391 | 7/1958 | Albers | 251/319 |
| 3,383,085 | 5/1968 | Vielmo | 251/149.5 |
| 4,306,705 | 12/1981 | Svensson | 251/149.9 |
| 4,354,490 | 10/1982 | Rogers | 604/905 |
| 4,468,225 | 8/1984 | Tchéraz | 604/248 |

FOREIGN PATENT DOCUMENTS

| 3026372 | 2/1982 | Fed. Rep. of Germany . |
| WO82/00698 | 3/1982 | PCT Int'l Appl. . |
| 352205 | 3/1961 | Switzerland . |

Primary Examiner—A. Michael Chambers
Attorney, Agent, or Firm—Merchant, Gould, Smith, Edell, Welter & Schmidt

[57] ABSTRACT

Slide valve and coupling unit for flow control. This unit comprises a slide valve with a valve housing forming a first fluid flow passage, and a slide valve element guided for displacement between closed and open positions in relation to said passage. The unit also comprises a coupling element including a coupling housing which forms a second fluid flow passage to be connected to said first passage, and a recess to receive therein that portion of the valve housing which contains the slide valve element. When the valve housing is received with said portion in the recess of the coupling housing, the valve housing can be displaced in relation to the coupling housing while the slide valve element is retained in the recess, to a position wherein fluid flow connection is established through the passages.

4 Claims, 16 Drawing Figures

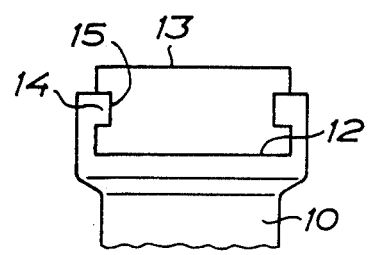
FIG. 3
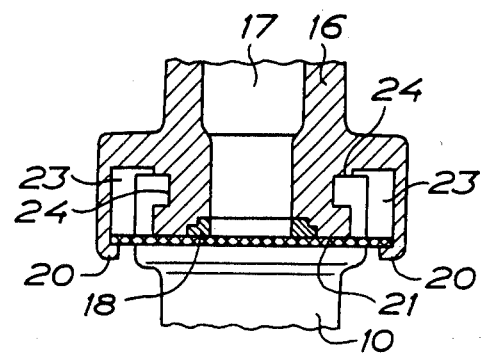
FIG. 4
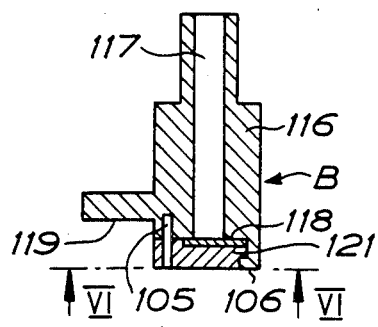
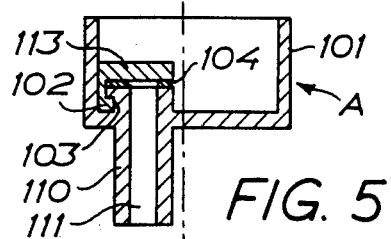
FIG. 5
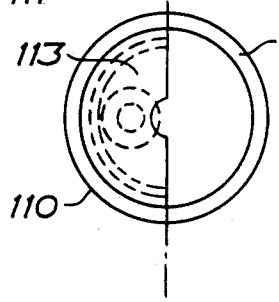
FIG. 7
FIG. 6
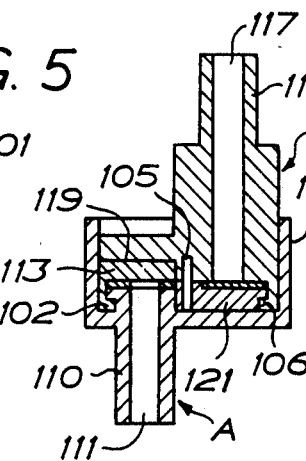
FIG. 8
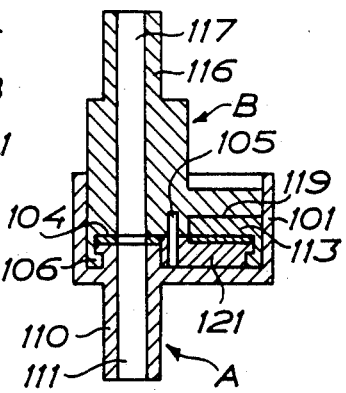
FIG. 9

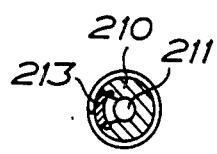
FIG. 12
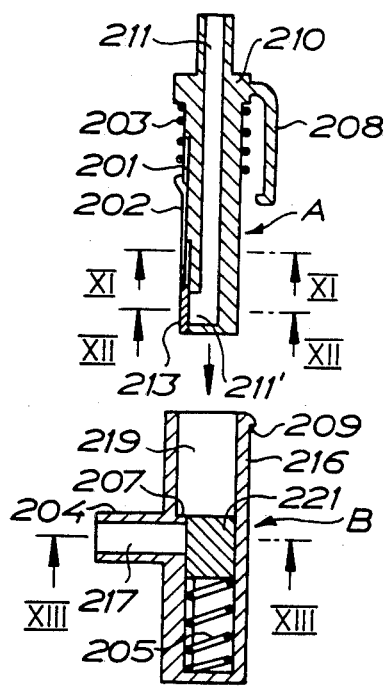
FIG. 10
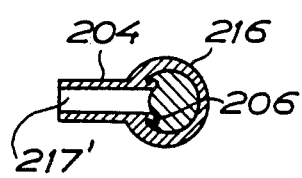
FIG. 13
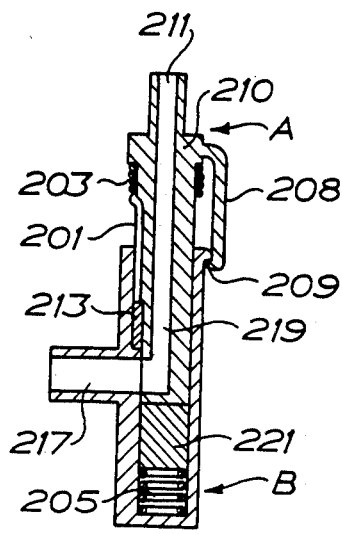
FIG. 14
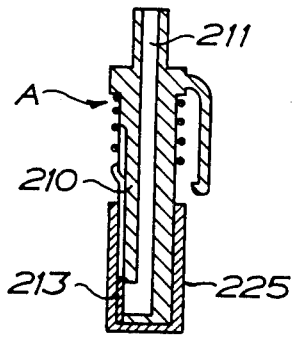
FIG. 15
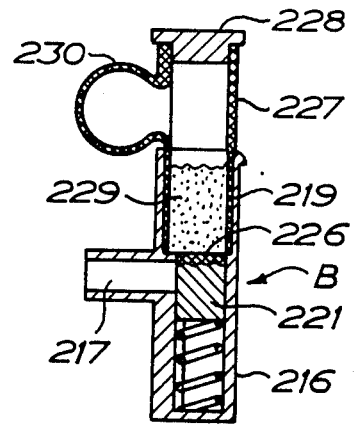
FIG. 16

SLIDE VALVE AND COUPLING UNIT

This invention relates to a slide valve and coupling unit for flow control, comprising a slide valve with a valve housing forming a first fluid flow passage, at least one slide valve element in said valve housing, and guide means for guiding the slide valve element between a closed position in which the slide valve element is positioned across said first passage to keep it closed, and an open position in which said passage is open, and a coupling element including a coupling housing forming a second fluid flow passage which can be connected to said first passage, and a recess to receive therein at least the portion of the valve housing containing the slide valve element.

A slide valve and coupling unit of this type is described in the European Pat. No. 0,028,601.

The unit is primarily intended for use when body fluids are to be drained or removed from the body, e.g. when urine is collected from incontinent persons or when fluids, such as blood, medicines or other therapeutic fluids are to be administered to the body as in transfusion, infusion and peritoneal dialysis (bag dialysis).

The purpose of the invention is to simplify the construction of the slide valve and coupling unit and to facilitate the use thereof without neglecting the demand for complete sealing between the various parts of the unit and the possibility of maintaining sterility with respect to the surroundings as well as the person who is in some way or other connected to the slide valve and coupling unit.

In order to achieve this purpose there is provided according to the invention a slide valve and coupling unit of the type referred to above wherein said valve housing with said portion received in the recess of the coupling housing is displaceable in relation to the coupling housing while retaining the slide valve element in the recess, to a position in which fluid flow connection is established through said first and second fluid flow passages.

Additional objects and advantages of the invention in part will be set forth in the description which follows and in part will be obvious from the description or may be learned by practice of the invention.

The accompanying drawings which are incorporated in and constitute a part of this specification, illustrate several embodiments of the invention and together with the description serve to explain in more detail the principles of the invention.

In the drawings

Figure 2:
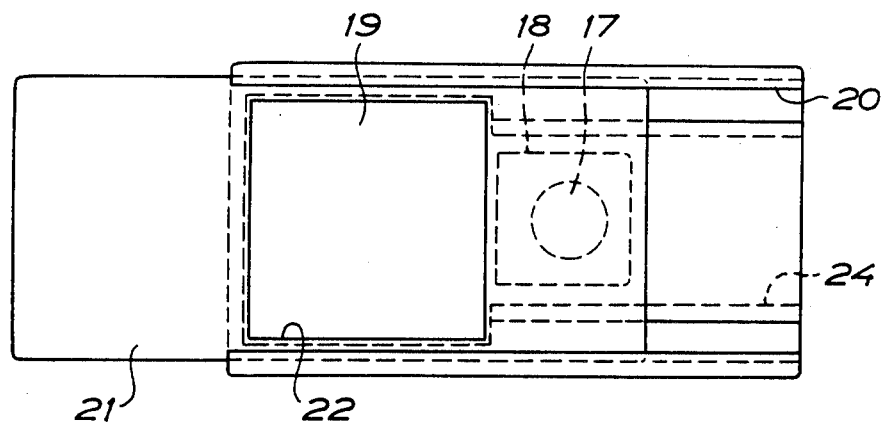

FIG. 1 is an axial cross-sectional view of the slide valve and coupling unit in one embodiment thereof with the slide valve positioned for connection with the coupling element, FIG. 2 is a bottom plan view of the coupling element, FIG. 3 is a fragmentary view of the slide valve taken along line III—III in FIG. 1, FIG. 4 is a cross-sectional view taken along line IV—IV in FIG. 1, FIG. 5 is an axial cross-sectional view of a second embodiment of the slide valve and connecting unit having the slide valve and the coupling element separated, FIG. 6 is a view of the coupling element taken along line VI—VI in FIG. 5, FIG. 7 is a plan view of the slide valve in FIG. 5, FIG. 8 is a view similar to FIG. 5 with the parts of the slide valve and coupling unit positioned for interconnection, FIG. 9 is a view similar to FIG. 5 with the parts of the unit interconnected, FIG. 10 is an axial cross-sectional view of a third embodiment of the slide valve and connecting unit of the invention, FIG. 11 is a cross-sectional view taken along line XI—XI in FIG. 10, FIG. 12 is a cross-sectional view taken along line XII—XII in FIG. 10, FIG. 13 is a cross-sectional view taken along line XIII—XIII in FIG. 10, FIG. 14 is a view similar to FIG. 10 with the parts of the slide valve and coupling unit interconnected, FIG. 15 is an axial cross-sectional view of the slide valve in the embodiment of FIGS. 10 to 14 with a sterile device, and FIG. 16 is an axial cross-sectional view of the coupling element of the slide valve and coupling unit of FIGS. 10 to 14 with a sterile device.

Reference will now be made in detail to the present preferred embodiments of the invention, examples of which are illustrated in the accompanying drawings wherein the slide valve is indicated generally by A and the coupling element is indicated generally by B.

In the embodiment of FIGS. 1 to 4 the slide valve comprises a valve housing 10 with a passage 11 for fluid flow. The valve housing is formed for passing a flexible hose onto the valve housing with a tight leak-proof fit whereby the passage 11 is connected to a container or other device. However, the valve housing can also form part of a container or other apparatus. The valve housing 10 forms an undercut groove 12 which receives a slide valve element 13 which closes off the opening of the passage 11. The slide valve element is displaceably guided on ribs 14 facing one another, which are received by grooves 15 of the slide valve element 13 such that this element can be displaced between the position shown in FIG. 1, which is the closed position, and another position, in which the opening of the passage 11 is uncovered and which thus is an open position.

The coupling element B comprises a coupling housing 16 with a passage 17 for fluid flow, and also the coupling housing is formed for passing a flexible hose onto the housing with leak-proof fit. A sealing ring 18 surrounds the opening of the passage 17. The coupling housing forms a cavity 19 which has such form and dimensions that the opening portion of the slide valve A, provided with the slide valve element 13, can be received therein. By means of flanges 20 a thin slide plate 21 is displaceably guided in the coupling housing, said slide plate forming an aperture 22 with such form and dimensions that the opening portion of the slide valve A can be passed through the slide plate from below into the cavity 19 when the slide plate is in the position shown with the aperture 22 in register with the cavity 19. Then, the slide plate engages the sealing element 18 and closes off the opening of the passage 17 in a leak-proof manner. In the coupling housing 16 there are provided at each side of the opening portion of the passage 17 a cavity 23, said cavities forming grooves 24 located such that they are in register with the ribs 14 as a rectilinear extension thereof when the opening portion of the slide valve A is inserted into the cavity 19, and have such dimensions and such form that the ribs 14 can be received therein.

When the slide valve A at the opening portion thereof has been inserted into the cavity 19 formed by the coupling housing 16, the slide valve element 13 being in the closed position, the slide valve A can be displaced to the right as seen in FIG. 1, the ribs 14 being inserted into the grooves 24 for interconnecting the slide valve A and the coupling unit B. By this operation the slide valve element will be pulled off the slide valve and will remain in the cavity 19 wherein the slide valve element 13 is secured by the slide plate 21 which follows the slide valve A at displacement thereof and thus will be pulled in below the slide valve element 13. By the displacement of the slide valve A to the right the passages 11 and 17 are brought in register and thus will communicate with each other, the sealing element 18 maintaining the sealing between the valve housing 10 and the coupling housing 16 in the interface between the two housings. It should be noticed that the end surface of the valve housing 10 at the opening of the passage 11 which can be closed by means of the valve element 13, and the end surface of the coupling housing 16 at the opening of the passage 17 which can be closed by means of the slide plate 21, are never exposed to the surroundings whereby transmission of bacteria or contaminants between the passages 11 and 17 and the surroundings is prevented.

Interconnection of the two parts of the slide valve and coupling unit, i.e. the slide valve A and the coupling element B, is obtained in the embodiment described with reference to FIGS. 1 to 4 by linear displacement of the slide valve A in the coupling element B, but in the embodiment of FIGS. 5 to 9 this operation is effected by relative rotation of the two parts of the unit. Referring to FIGS. 5 to 9, the slide valve A comprises a semi-circular slide valve element 113 which is displaceable inside a sleeve 101 formed by the slide valve housing 110, said element being displaceably guided by means of a rib 102 in a guide groove 103 formed by the valve housing 110. Between the end surface of the valve housing 110 at the opening of the passage 111 formed therein, and the valve element 113 there is provided a sealing element 104.

On the housing 116 of the coupling element, which forms a passage 117, a semi-circular slide plate 121 is rotatably mounted by means of a pin 105, said plate being adapted to close off the opening of the passage 117. A sealing element 118 is provided between the slide plate and the coupling housing. The coupling housing 116 forms a recess 119 to receive therein the opening portion of the slide valve housing 110 and the slide valve element 113 mounted on said housing, when the slide valve element is in the closed position.

When the two parts of the slide valve and coupling unit are brought together as shown in FIG. 8, the coupling housing being inserted into the space surrounded by the sleeve 101 and the opening portion of the valve housing 110 with the slide valve element 113 being received in the recess 119, the two parts of the unit can be rotated in relation to each other to the position of FIG. 9. Then, the slide plate 121 is moved away from the opening of the passage 117 by means of the slide valve housing 110, and the slide valve element 113 is moved away from the opening of the passage 111 by means of the coupling element B to bring the two passages in register. The sealing in the interface between the passages is maintained by means of the sealing element 104. The slide valve element 113 and the slide plate 121 will be disposed one upon the other and the two parts of the unit will be interconnected by a rib 106 on the coupling housing 116 being inserted into the groove 103 in the valve housing 110, the rib 102 of the slide valve element 113 previously being received by said groove. As will be seen the operation is the same as that of the embodiment of FIGS. 1 to 4.

In the third embodiment of the invention which is shown in FIGS. 10 to 14 to which reference is made, the two parts of the unit are arranged for axial displacement in relation to each other when said parts are being interconnected. The valve housing 210 forms a passage 211 which extends centrally through the valve housing formed as a cylindrical body, and forms an angled opening portion 211' opening in the curved surface of the valve housing. The slide valve element 213 is displaceably guided in an undercut groove 212 which connects with a groove 201 receiving and guiding an arm 202 connected with the slide valve element 213. This arm is biased by means of a helical spring 203 encompassing the valve housing 210, said spring maintaining the slide valve element 213 in the position shown in FIG. 10 wherein the slide valve element covers the opening of the passage 211 at the opening portion 211'.

Also the housing 216 of the coupling element is cylindrical and has an axial cavity 219 which connects with a radial passage 217 in a socket 204 formed by the coupling housing and projecting therefrom. A slide element 221 is displaceably guided in the cavity 219 and is biased to the position shown in FIG. 10 by means of a helical spring 205 positioned in the passage. In said position, the slide element 221 closes off the connection between the cavity 219 and the passage 217 thereof. The coupling housing 216 forms inside the cavity 219 two ribs 206 received by corresponding grooves in the slide element 221, said ribs forming a shoulder 207 at the passage 217. A resilient hook 208 is provided on the slide valve for co-operation with a shoulder 209 on the coupling housing 216.

When the two parts of the units, i.e. the slide valve A and the coupling element B, are pushed together, the housing 210 of the slide valve being received by the cavity 219 of the coupling element, the slide valve element 213 will be stopped at the shoulder 207 and will be displaced from the opening portion 211' against the bias of the spring 203. At the same time the slide element 221 will be depressed to uncover the cavity 219 against the bias of the spring 205. When the hook 208 engages the shoulder 209 to interconnect the two parts of the unit, the opening portion 211' registers with the passage 217 and thus connection is established between this passage and the passage 211 of the slide valve housing 210.

Sealing elements provided in the embodiments described—such sealing elements can be arranged also in the embodiment of FIGS. 10 to 14 although they have not been shown in said latter embodiments—can be of such construction that they can maintain a disinfection agent (bactericide). E.g. the sealing element can be made of a resilient porous material. However, the disinfection agent (bactericide) can also be entrained into a lubricant applied to the sealing elements. E.g. chlorhexidine acetate very well can be mixed with a silicone lubricant which is then applied to the sealing element. It is also possible to maintain sterile interior conditions in the slide valve and coupling unit at repeated interconnection and disconnection of the two parts of the unit by the arrangement shown in FIGS. 15 and 16. According to FIG. 15, a socket 225 of a bactericide is slid onto the housing 210 of the slide valve A to cover the opening portion of the housing of the slide valve element 213.

In FIG. 16, there is provided on the slide element 221 a layer 226 of a bactericide. Moreover, a socket 227 of a bactericide is inserted into the cavity 219 and is provided with a removable cover 228. A bactericide 229 is received in the socket 227. This forms an expansion space 230 which can receive the bactericide 229 when the slide valve A is inserted into the coupling element B. The cover 228 instead of being removable can be of such character that it can be penetrated by the valve housing 210 and will reclose when the valve housing is withdrawn from the cover. Analogue arrangements can be used in the other embodiments of the invention.

It will be apparent to those skilled in the art that various other modifications and variations could be made in the embodiments of the slide valve and coupling unit described herein without departing from the scope and spirit of the invention.

We claim:

1. Slide valve and coupling unit for flow control, comprising a slide valve including a valve housing forming a first fluid flow passage, and a first slide valve element in said valve housing, guided for lateral displacement between a closed position in which the first slide valve element is positioned across said first passage to keep it closed, and an open position in which said passage is uncovered by said first slide element; and a coupling element including a coupling housing forming a second fluid flow passage which can be connected to said first passage, a second slide valve element in said coupling housing, guided for displacement between a closed position in which the second slide valve element is positioned across said second passage to keep it closed, and an open position in which said second passage is uncovered by the second slide element, said coupling housing also forming a recess to receive therein at least the portion of the valve housing containing the first slide valve element, a sealing element located in the coupling housing around the opening of said second fluid flow passage, said valve housing being displaceable in relation to the coupling housing to a displaced position to engage said second slide valve element for displacement thereof to the open position, and forming an interface surface to be engaged by the sealing element at said surface in said displaced position, said valve housing further including means for retaining the first slide valve element in said recess during the displacement of the first slide valve element, a sealed fluid flow connection being established through said first and second fluid flow passages in said displaced position.

2. Slide valve and coupling unit as claimed in claim 1 further comprising means interconnecting the valve housing and the coupling housing by said displacement.

3. Slide valve and coupling unit as claimed in claim 1 further comprising a slide plate mounted for displacement on the coupling element and having an opening for insertion of the slide valve into said recess, said slide plate supporting the slide valve element in the open position thereof.

4. A slide valve and coupling according to claim 1 wherein said first and second slide valve elements are planar and wherein said coupling element has a planar surface aligned with said elements to form a continuous planar surface thereacross, said valve housing including a first set of L-shaped flanges extending therefrom toward said coupling elements and being spaced to receive said elements, said retaining means including a second pair of L-shaped flanges extending from said valve housing and located between said first pair of flanges, a third pair of L-shaped flanges extending from said coupling element and defining an undercut groove for receiving said second pair of flanges, whereby said first and second slide valve elements and maintained in contact with said valve housing by said first flanges and said coupling element is maintained in contact with said valve housing by said second and third flanges.

* * * * *